(12) United States Patent
Matsunaga et al.

(10) Patent No.: US 11,423,188 B2
(45) Date of Patent: Aug. 23, 2022

(54) INFORMATION PROTECTION DEVICE AND ELECTRONIC APPARATUS

(71) Applicant: NEC Platforms, Ltd., Kawasaki (JP)

(72) Inventors: Kohji Matsunaga, Kanagawa (JP); Kunihiko Endoh, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 51 days.

(21) Appl. No.: 16/975,584

(22) PCT Filed: Feb. 21, 2019

(86) PCT No.: PCT/JP2019/006579
§ 371 (c)(1),
(2) Date: Aug. 25, 2020

(87) PCT Pub. No.: WO2019/167798
PCT Pub. Date: Sep. 6, 2019

(65) Prior Publication Data
US 2020/0410141 A1   Dec. 31, 2020

(30) Foreign Application Priority Data

Feb. 27, 2018 (JP) .............................. JP2018-033107

(51) Int. Cl.
*G06F 21/87* (2013.01)
*G01R 33/07* (2006.01)
*H04L 9/10* (2006.01)

(52) U.S. Cl.
CPC ............. *G06F 21/87* (2013.01); *G01R 33/07* (2013.01); *H04L 9/10* (2013.01)

(58) Field of Classification Search
CPC ....... G06F 21/87; G01R 33/07; G01R 33/072; G01R 33/075; H04L 9/10; H04L 9/12
See application file for complete search history.

(56) References Cited

U.S. PATENT DOCUMENTS

| | | | | |
|---|---|---|---|---|
| 4,893,201 A | * | 1/1990 | Emori | ................. G11B 5/5547 360/77.04 |
| 7,015,902 B2 | * | 3/2006 | Nagai | ...................... G09G 3/32 345/204 |

(Continued)

FOREIGN PATENT DOCUMENTS

| JP | 2004-171246 A | 6/2004 |
|---|---|---|
| JP | 2004-252656 A | 9/2004 |

(Continued)

OTHER PUBLICATIONS

International Search Report for PCT Application No. PCT/JP2019/006579, dated May 21, 2019.

(Continued)

*Primary Examiner* — Hosuk Song
(74) *Attorney, Agent, or Firm* — Sughrue Mion, PLLC

(57) ABSTRACT

An information protection device includes: a random-contact mechanical Hall element provided with a conductive plate that has a prescribed conductive pattern, and a contact plate that is stacked on the conductive plate and that has, in an interior thereof, a connection portion partially contacting the conductive pattern; a communication line having multiple signal wires that are respectively connected to the connection portion in the random-contact mechanical Hall element; and a control unit configured to, through the communication line, monitor connection information between the connection portion and the conductive pattern in the random-contact mechanical Hall element, and determine, based on the connection information, whether or not iniquity has occurred in accordance with whether or not a connection state between the conductive pattern and the connection portion has changed from an initial setting.

9 Claims, 8 Drawing Sheets

(56) References Cited

U.S. PATENT DOCUMENTS

| | | | |
|---|---|---|---|
| 7,672,756 B2* | 3/2010 | Breed .................... | G07C 5/008 |
| | | | 701/1 |
| 9,529,474 B2* | 12/2016 | Sasahara ............... | G06F 3/0416 |
| 10,515,048 B2* | 12/2019 | Lee ........................ | G06F 3/0679 |
| 2014/0304841 A1 | 10/2014 | Wu et al. | |

FOREIGN PATENT DOCUMENTS

| | | |
|---|---|---|
| JP | 2006-229667 A | 8/2006 |
| JP | 2007-175373 A | 7/2007 |
| JP | 2011-086034 A | 4/2011 |
| JP | 2011-129011 A | 6/2011 |
| JP | 2012-173905 A | 9/2012 |
| JP | 2017-224109 A | 12/2017 |
| WO | 2016/180977 A1 | 11/2016 |

OTHER PUBLICATIONS

Japanese Notice of Allowance for JP Application No. 2018-033107 dated Dec. 4, 2018 with English Translation.

* cited by examiner

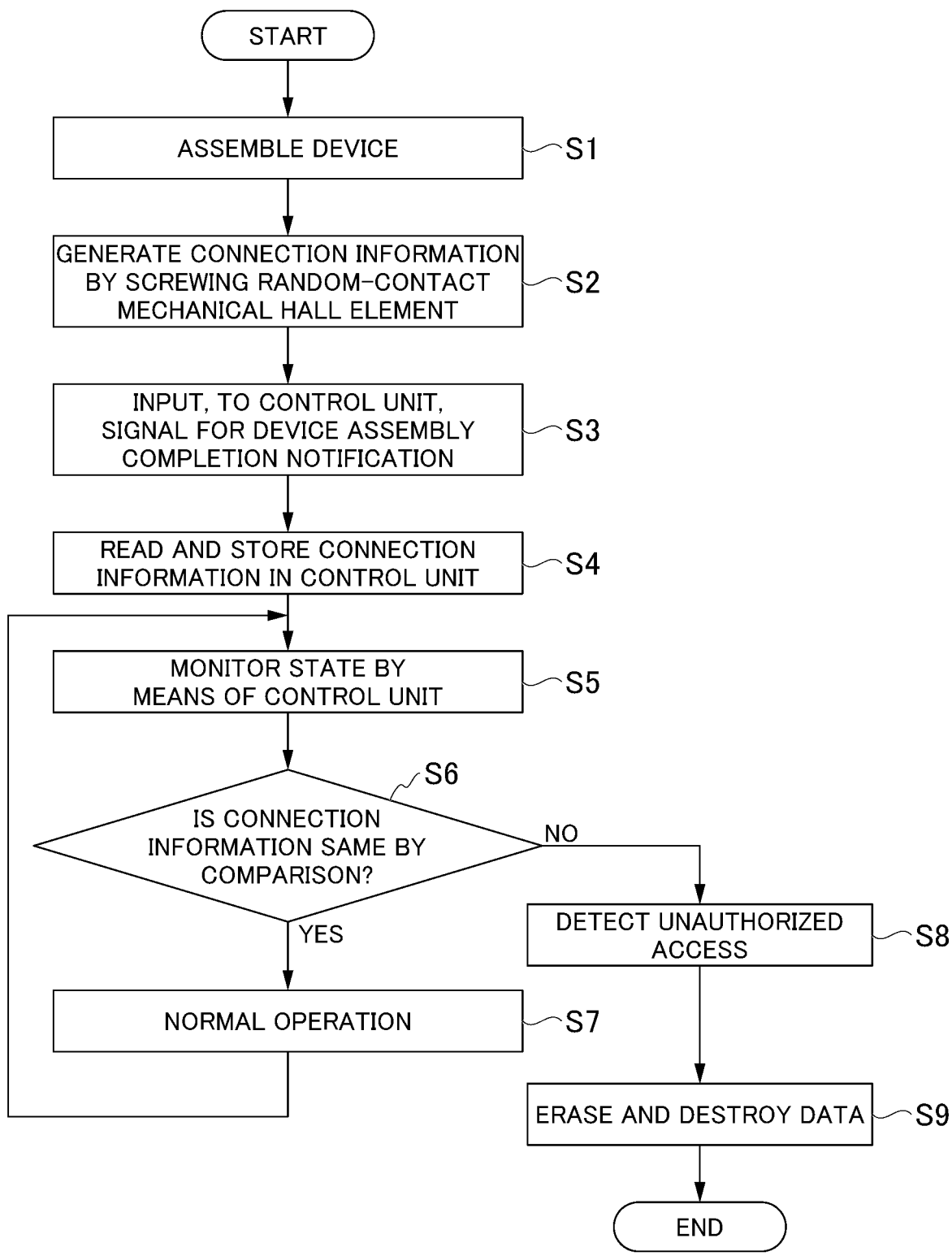

INFORMATION PROTECTION DEVICE AND ELECTRONIC APPARATUS

This application is a National Stage Entry of PCT/JP2019/006579 filed on Feb. 21, 2019, which claims priority from Japanese Patent Application 2018-033107 filed on Feb. 27, 2018, the contents of all of which are incorporated herein by reference, in their entirety.

TECHNICAL FIELD

The present invention relates to an information protection device that is highly tamper resistant, and an electronic apparatus using this information protection device.

BACKGROUND ART

In order to protect internal circuits containing secret information, various types of security measures for preventing unauthorized access are sometimes implemented on the covers of casings housing circuit boards or the like.

As unauthorized access detection means, a switch or the like is often used. However, if the same mechanism is employed in multiple devices, then the analysis of a single device will compromise the other devices.

For example, in the tamper-resistant device indicated in Patent Document 1, a Hall element and a Hall voltage detection unit are provided in a storage case having a cover. In said tamper-resistant device, when the cover is removed and the Hall voltage in the storage case changes, a switch is operated and the data in the volatile memory is erased.

Additionally, the detection device described in Patent Document 2 has a control unit in which first to third conductive patterns are connected. This control unit assumes that iniquity has occurred when the electrical connection between the first conductive pattern and the second conductive pattern becomes disconnected, and destroys secret information that is of particularly high confidentiality in the internally stored information.

CITATION LIST

Patent Literature

[Patent Document 1] Japanese Unexamined Patent Application First Publication No. 2006-229667
[Patent Document 2] Japanese Unexamined Patent Application First Publication No. 2017-224109

SUMMARY OF THE INVENTION

Problems to be Solved by the Invention

The unauthorized access detection means described in Patent Documents 1 and 2 only detect whether or not iniquity has occurred, and cannot obtain any more detailed unauthorized access information.

The example object of present invention, which was made in consideration of the above-mentioned circumstances, provides an information protection device that can more precisely detect unauthorized access at individual detection sites and that can obtain tamper resistance, and an electronic apparatus using this information protection device.

Means for Solving the Problems

In order to solve the above-mentioned problem, the present invention proposes the means indicated below.

According to an exemplary aspect of the present invention includes: a random-contact mechanical Hall element provided with a conductive plate that has a prescribed conductive pattern, and a contact plate that is stacked on the conductive plate and that has, in an interior thereof, a connection portion partially contacting the conductive pattern; a communication line having multiple signal wires that are respectively connected to the connection portion in the random-contact mechanical Hall element; and a control unit configured to, through the communication line, monitor connection information between the connection portion and the conductive pattern in the random-contact mechanical Hall element, and determine, based on the connection information, whether or not iniquity has occurred in accordance with whether or not a connection state between the conductive pattern and the connection portion has changed from an initial setting.

Advantageous Effects of Invention

The present invention is able to obtain tamper resistance by directly detecting unauthorized access from the outside.

BRIEF DESCRIPTION OF THE DRAWINGS

FIG. 5 is a flow chart indicating the operations performed by the information protection device according to the first embodiment.

DESCRIPTION OF EMBODIMENTS

The information protection device 100 according to the minimum structure of the present invention will be explained with reference to FIGS. 1A to 1C.

Figure 1A:
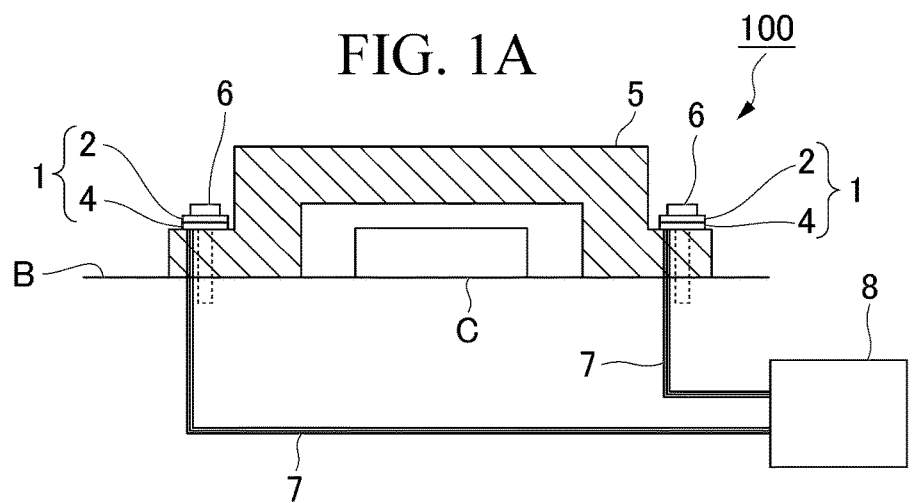
FIG. 1A is a schematic structural diagram of an information protection device according to a minimum structure of the present invention, and is a front section view illustrating the overall structure.
Figure 1B:
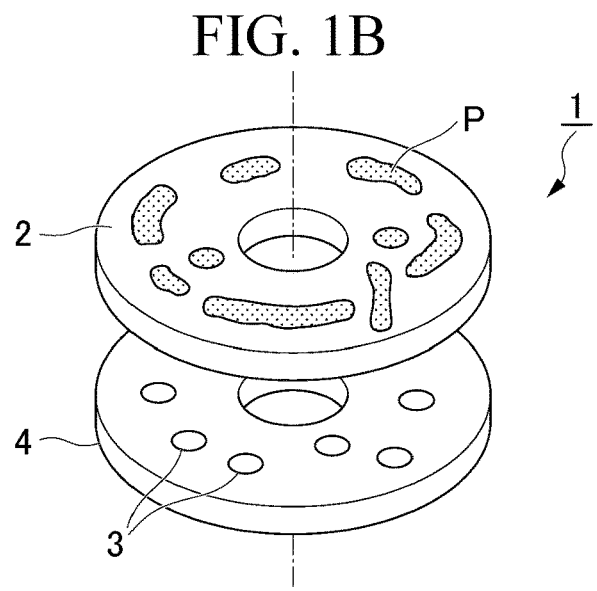
FIG. 1B is a schematic structural diagram of the information protection device according to the minimum structure of the present invention, and is a perspective view illustrating the structures of a conductive plate and a contact plate in a random-contact mechanical Hall element.
Figure 1C:
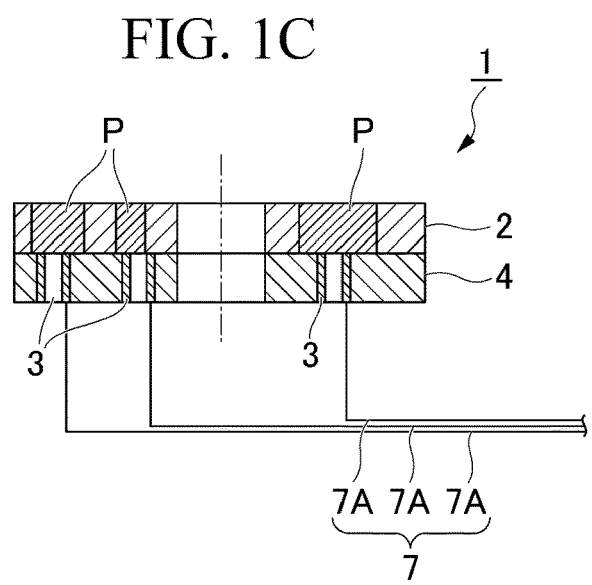
FIG. 1C is a schematic structural diagram of the information protection device according to the minimum structure of the present invention, and is a section view illustrating the state of connection between the conductive plate and the contact plate in the random-contact mechanical Hall element.

The elements indicated by reference number 1 in FIGS. 1A to 1C are random-contact mechanical Hall elements, each provided with a conductive plate 2 having specific conductive patterns P, and a contact plate 4 that is stacked on the conductive plate 2 and that has, in the interior thereof, connection portions 3 partially contacting the conductive patterns P.

These random-contact mechanical Hall elements 1 are used, for example, when fastening onto a base B, by means of fastening means 6, a component 5 to be protected (such as a protective cover or a control board) containing, in the interior thereof, a circuit board C having protected information.

As illustrated in FIG. 1C, the random-contact mechanical Hall element 1 is provided with a communication line 7 having multiple signal wires 7A each connected to a connection portion 3.

The communication line 7 supplies, to a control unit 8, connection information regarding the connections between the conductive patterns P and the partially contacting connection portions 3 in the random-contact mechanical Hall element 1.

The control unit 8 monitors the connection information between the connection portions 3 and the conductive patterns P in the random-contact mechanical Hall element 1 through the communication line 7, and determines, based on the connection information, whether or not iniquity has occurred, in accordance with whether or not the connection states between the conductive patterns P and the connection portions 3 have changed from the initial settings.

As the communication line 7, aside from using a cable, wiring in an inner-layer pattern in a circuit board can be used.

In the information protection device 100 having the structure mentioned above, a random contact mechanical Hall element 1 comprising a conductive plate 2 having specific conductive patterns P and a contact plate having connection portions 3 partially contacting the conductive patterns P is used. For this reason, it is possible to use fastening means 6 to appropriately mount the random-contact mechanical Hall element 1 to a component 5 to be protected (such as a protective cover or a control board) having information to be protected in the interior thereof.

On the other hand, the control unit 8 monitors the connection information between the conductive patterns P and the connection portions 3 supplied from the random-contact mechanical Hall element 1 through the signal wires 7A in the communication line 7, and determines whether or not the connection information has changed from the connection state in the initial setting. In this way, it is possible to determine whether or not iniquity has occurred.

Thus, with the random-contact mechanical Hall element 1 mounted on a component having information to be protected in the interior thereof, the information protection device 100 can monitor the state of the connection patterns P in the random-contact mechanical Hall elements 1 by means of the connection information. Therefore, unauthorized access from the outside can be immediately detected, thereby providing a high level of tamper resistance.

Additionally, in the above-mentioned information protection device 100, various specific connection states between the connection patterns P and conductive portions 3 can be formed as initial settings in the random-contact mechanical Hall element 1. For this reason, by monitoring the specific connection states, it is possible to determine the part of the device in which unauthorized access occurred, and to more precisely detect iniquity.

Additionally, while the above-described information protection device 100 can be appropriately mounted on a component 5 to be protected (such as a protective cover or a control board) having a high level of confidentiality in the interior thereof, some of the possible fields of application thereof include electronic apparatuses such as various types of information processing devices, automatic teller machines and game machines.

First Embodiment

The information protection device 101 according to the first embodiment of the present invention will be explained with reference to FIGS. 2 to 5.

Figure 2:
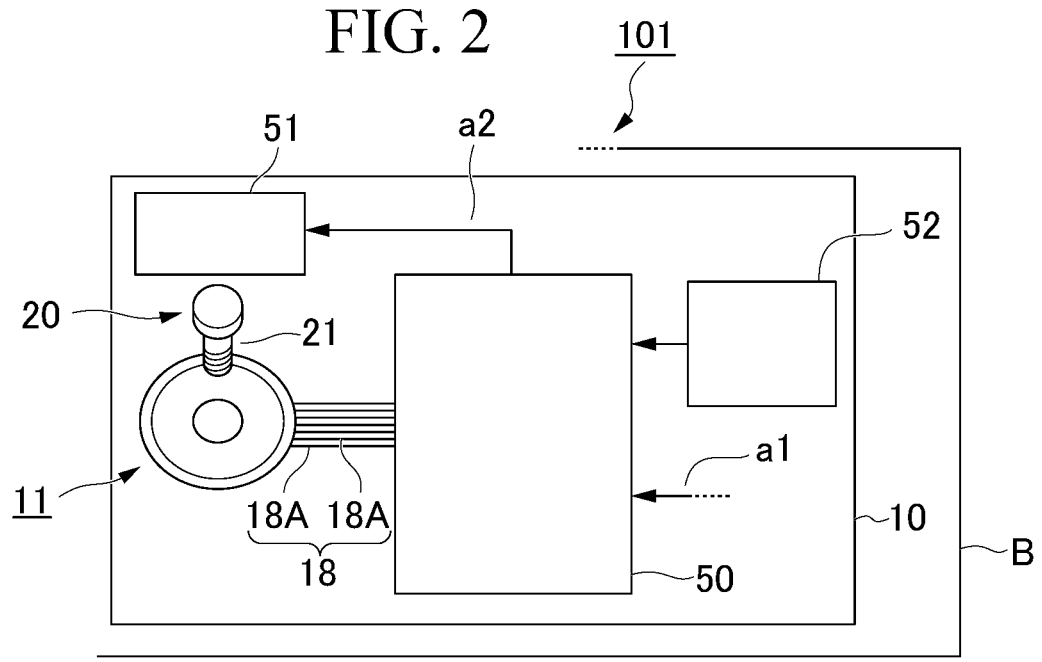
FIG. 2 is a schematic structural diagram of the information protection device according to a first embodiment of the present invention.
Figure 3A:
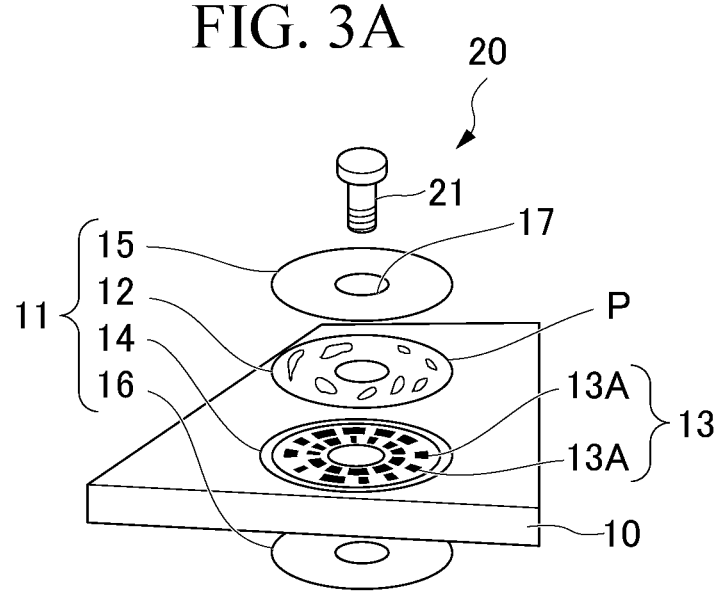
FIG. 3A is a diagram illustrating a random-contact mechanical Hall element according to a first embodiment, and is an exploded perspective view.
Figure 3B:
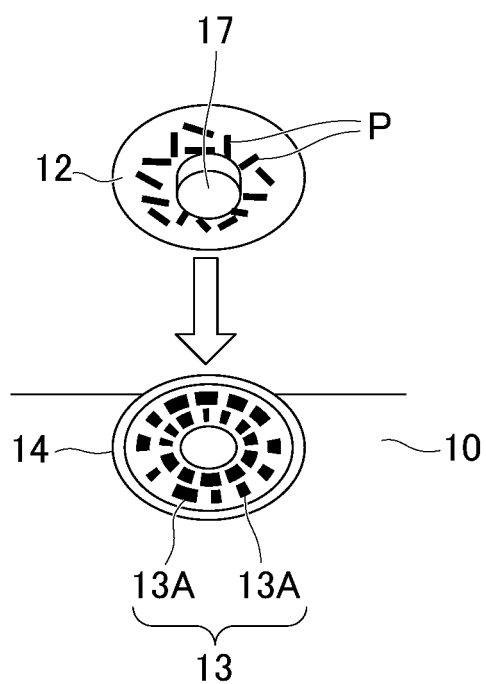
FIG. 3B is a diagram illustrating the random-contact mechanical Hall element according to the first embodiment, and is a perspective view illustrating the details of the conductive plate and the contact plate.

The element indicated by reference number 10 in FIGS. 2, 3A and 3B is a printed wiring board, which is installed on the base B by means of a random-contact mechanical Hall element 11 and a fastening member 20.

On this printed circuit board 10, a control unit 50 for reading, comparing, storing and encrypting data and the like, an internal circuit 51 for storing secret data, a backup circuit 52 for backing up the data, and the like are installed.

The random-contact mechanical Hall element 11, as illustrated in FIGS. 3A and 3B, comprises: a ring-shaped conductive plate 12 having specific conductive patterns P; a ring-shaped contact plate 14 that is stacked on the conductive plate 12 and that has, in the interior thereof, connection portions 13 partially contacting the conductive patterns P; and a pair of ring-shaped protective plates 15, 16 arranged to sandwich the conductive plate 12 and the contact plate 14.

Additionally, a through-hole 17 that penetrates through the conductive plate 12, the contact plate 14 and the protective plates 15, 16 is provided in a central portion of the random-contact mechanical Hall element 11.

Furthermore, in the random-contact mechanical Hall element 11, the printed wiring board 10 is fixed to the base B through the conductive plate 12, the contact plate 14 and the protective plates 15, 16 when a bolt 21 (or a pin), which is the fastening member 20, is fastened to the through-hole 17.

The connection portions 13 in the contact plate 14 are formed from multiple via-holes 13A that are arranged to penetrate through the contact plate 14.

Signal wires 18A of a communication line 18 are respectively connected to the via-holes 13A of these connection portions 13.

In this way, the conductive patterns P formed in the conductive plate 14 are electrically connected to the signal wires 18A of the communication line 18 through the vias 13 in the connection portions 13.

The protective plates 15, 16 are formed from metallic plates composed, for example, of lead, thereby preventing the connection state between the conductive plate 12 and the contact plate 14 from being analyzed, for example, by irradiation with X-rays or the like.

The communication line 18 supplies to the control unit 50, as connection information, the connection states between the conductive patterns P and the partially contacting connection portions 13 in the random-contact mechanical Hall element 11, in other words, contact patterns indicating the contact sites between the conductive patterns P and the connection portions 13.

Furthermore, in this control unit 50, the original connection state between the conductive patterns P and the connection portions 13 inside the random-contact mechanical Hall element 11 is stored as initial setting data.

Figure 4A:
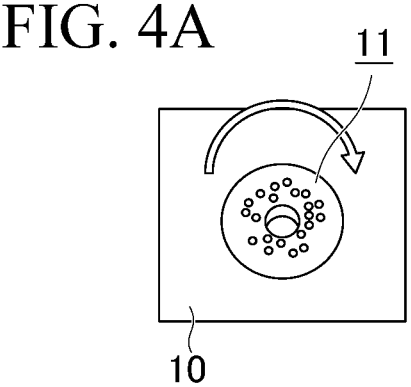
FIG. 4A is a first plan view for explaining that various connection states can be formed by rotating the conductive plate having conductive patterns relative to the contact plate having connection portions.
Figure 4B:
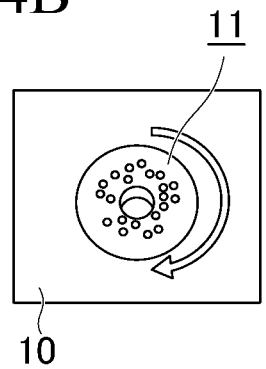
FIG. 4B is a second plan view for explaining that various connection states can be formed by rotating the conductive plate having conductive patterns relative to the contact plate having connection portions.
Figure 4C:
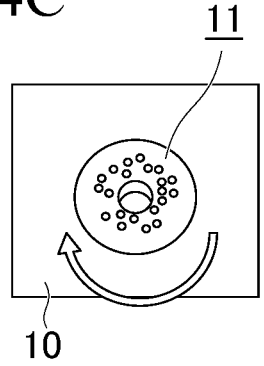
FIG. 4C is a third plan view for explaining that various connection states can be formed by rotating the conductive plate having conductive patterns relative to the contact plate having connection portions.

As this initial setting data, it is possible to form various connection states by rotating the conductive plate 12 having the conductive patterns P relative to the contact plate 14 having the connection portions 13 comprising multiple via-holes 13A, as illustrated in FIGS. 4A to 4C.

Thus, in each random-contact mechanical Hall element 11, it is possible to easily form a specific connection state in the initial setting stage. When there are multiple random-contact mechanical Hall elements 11, a connection state specific to each random-contact mechanical Hall element 11 can be formed.

The control unit 50 monitors the connection information between the conductive patterns P and the connection portions 13 in the random-contact mechanical Hall element 11 through the communication line 18, and compares the connection information with the initial setting data. By means of this comparison, the control unit 50 determines whether or not iniquity has occurred in accordance with whether or not the connection state between the conductive patterns P and the connection portions 13 has changed from the initial setting.

Next, the operations of the information protection device 101 according to the first embodiment will be explained by each step S with reference to FIG. 5.

[Step S1]

The printed wiring board 10 is installed on the base B by means of the random-contact mechanical Hall element 11 and the fastening member 20. For example, the printed wiring board 10 is fixed to the base B by fastening the fastening member 20 to the random-contact mechanical Hall element 11.

[Step S2]

The control unit 50 receives, as initial setting data, connection information indicating the connection state between the conductive patterns P in the conductive plate 12 and the connection portions 13 in the contact plate 14 in the random-contact mechanical Hall element 11.

[Step S3]

Based on the initial setting data that has been received in step S2, a device assembly completion notification (represented by reference number a1 in FIG. 2) is sent to the control unit 50. This notification may, for example, be supplied to the control unit 50 by a manual operation by a worker.

[Step S4]

The initial setting data indicating the connection state between the conductive patterns P in the conductive plate 12 and the connection portions 13 in the contact plate 14 in the random-contact mechanical Hall element 11 is stored in the control unit 50.

[Steps S5 and S6]

In the control unit 50, connection information indicating the connection state between the conductive patterns P in the conductive plate 12 and the connection portions 13 in the contact plate 14 in the random-contact mechanical Hall element 11 is received (step S5), and monitored by comparing the connection information with the initial setting data stored in step S4 (step S6). Furthermore, as a result of this comparative monitoring, if the connection state between the conductive patterns P in the conductive plate 12 and the connection portions 13 in the contact plate 14 is the same as that of the initial setting data (YES in step S6), then the procedure advances to step S7. If the state is not the same (NO in step S6), then the procedure advances to step S8.

[Step S7]

The procedure returns to the prior step S5 on the assumption that there has been no unauthorized access of the information protection device 101 and the situation is normal.

[Step S8]

The procedure advances to the next step S9 on the assumption that there has been unauthorized access of the information protection device 101.

[Step S9]

The control unit 50 outputs, to the internal circuit 51 storing the secret data, a signal (represented by reference number a2 in FIG. 2) to erase and destroy the data, and the procedure in the present flow chart ends.

In the case that multiple random-contact mechanical Hall elements 11 are installed on the printed wiring board 10, the procedure from steps S1 to S9 above is implemented for each random-contact mechanical Hall element 11.

At this time, in each random-contact mechanical Hall element 11, it is possible to form, in the initial setting, specific connection states between various conductive patterns P and the connection portions 13. For this reason, it is possible to determine which part of the device unauthorized access has occurred by monitoring the connection states of the random-contact mechanical Hall elements 11, thereby enabling more precise iniquity detection to be performed. In other words, when multiple random-contact mechanical Hall elements 11 are installed, the detailed unauthorized access occurrence conditions can be detected by allowing random-contact mechanical Hall elements 11 in which the unauthorized access has occurred to be identified.

In the information protection device 101 configured as described above, the random-contact mechanical Hall element 11 comprising the conductive plate 12 having specific conductive patterns P and the contact plate 14 having connection portions 13 partially contacting the conductive patterns P is used. For this reason, the random-contact mechanical Hall element 11 can be mounted, as appropriate, on the printed wiring board 10 having information to be protected.

Meanwhile, the control unit 50 is able to monitor connection information between the conductive patterns P and the connection portions 13 supplied from the random-contact mechanical Hall element 11 through the signal wires 18A of the communication line 18, and to determine whether or not iniquity has occurred in accordance with whether or not the connection information has changed from the connection state in the initial setting.

Thus, in the above-described information protection device 101, with the random-contact mechanical Hall element 11 mounted on the printed wiring board 10 having information to be protected, the state of the conductive patterns P in the random-contact mechanical Hall element 11 can be monitored by means of the connection information. Thus, unauthorized access from the outside can be immediately detected and a high level of tamper resistance can be obtained.

Additionally, in the above-described information protection device 101, specific connection states between various conductive patterns P and the connection portions 13 can be formed as the initial settings in each random-contact mechanical Hall element 11. Thus, by monitoring the specific connection state in each random-contact mechanical Hall element 11, it is possible to determine which part of the device the unauthorized access has occurred, thereby making more precise iniquity detection possible.

Additionally, with the above-mentioned information protection device 101, in the case in which it has been determined that iniquity has occurred based on the connection information supplied from the random-contact mechanical Hall element 11, a signal to erase and destroy data can be output to the internal circuit 51 storing secret data. As a result thereof, a higher level of security can be obtained.

Second Embodiment

The information protection device 102 according to the second embodiment of the present invention will be explained with reference to FIGS. 6 to 8.

The information protection device 102 according to the second embodiment has a different structure from that of the information protection device 101 according to the first embodiment in terms of the feature indicated below. Specifically, the information protection device 102 according to the second embodiment is provided with a protective cover 30 covering an internal circuit 51 storing secret data, and a random-contact mechanical Hall element 11 is provided in the protective cover 30 (see FIG. 6).

The random-contact mechanical Hall element 11 has the same structure as that in the first embodiment. Thus, the same reference numbers will be appended to the parts having the same structure, and duplicated explanations will be omitted.

Figure 6:
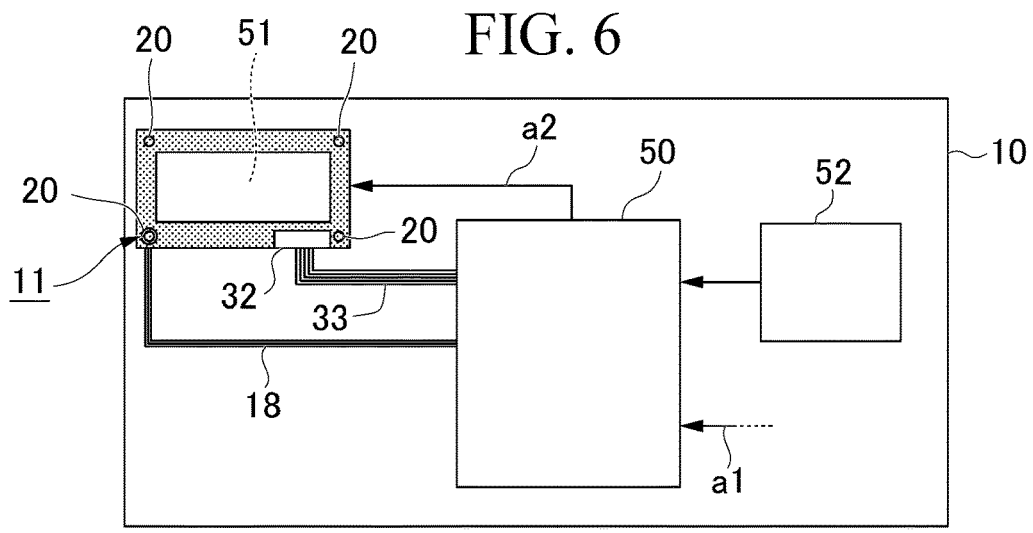
FIG. 6 is a schematic structural diagram of an information protection device according to a second embodiment of the present invention.
Figure 7A:
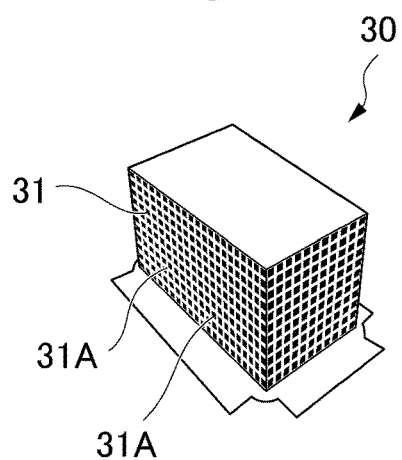
FIG. 7A is a diagram illustrating a protective cover, and is a view of the outer appearance.
Figure 7B:
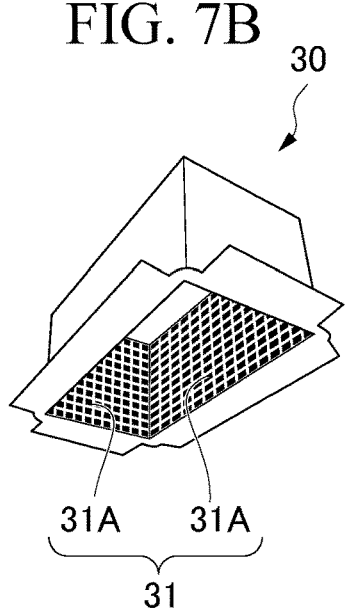
FIG. 7B is a diagram illustrating a protective cover, and is a view from below.
Figure 8:
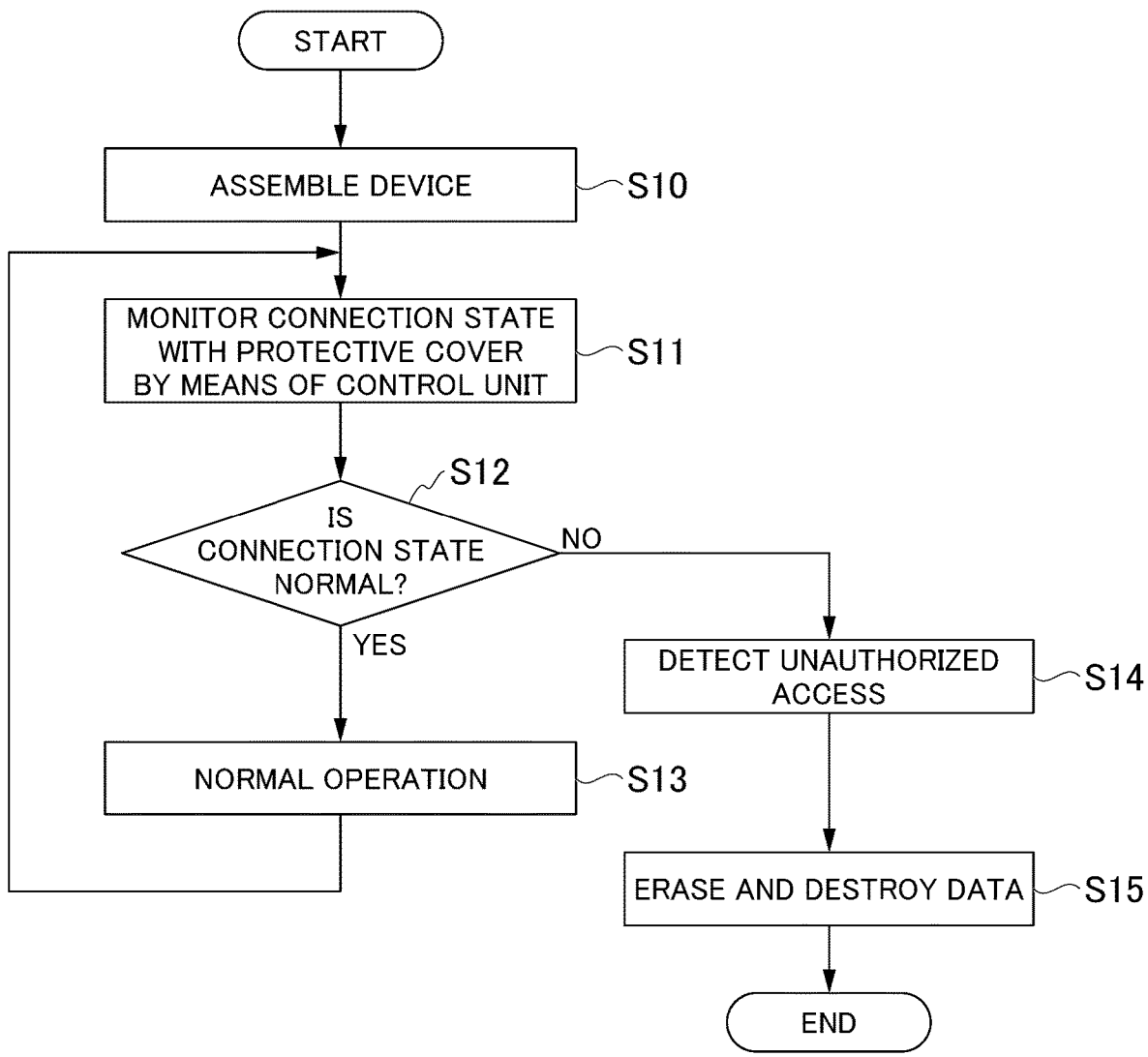
FIG. 8 is a flow chart indicating the operations performed by the information protection device according to the second embodiment.

The protective cover 30, as illustrated in FIGS. 6, 7A and 7B, is formed in the shape of a box overall. Additionally, at the peripheral edges of the protective cover 30, fastening members 20 are provided for fixation to the upper surface of the printed wiring board 10, with a random-contact mechanical Hall element 11 being interposed therebetween in parts of the peripheral edges.

FIG. 6 shows an example in which four sites around the protective cover 30 are fastened with fastening members 20, and a random-contact mechanical Hall element 11 is installed in one of the four fastening members 20.

Furthermore, in this information protection device 102, as in the first embodiment, connection information between the conductive patterns P and the connection portions 13 in the random-contact mechanical Hall element 11 is monitored by the control unit 50 through the communication line 18.

The control unit 50 monitors whether or not the connection state has changed from the initial setting by comparing the connection information between the conductive patterns P and the connection portions 13 with the initial setting data, thereby identifying abnormalities such as unauthorized opening of the protective cover 30.

Additionally, the inner surface of the protective cover 30 is provided with patterned wiring 31 in which multiple detection wires 31A are arranged so as to be parallel and to intersect with each other, as shown in FIGS. 7A and 7B.

The patterned wiring 31 is connected to the control unit 50 by a connector 32 and communication lines 33 as illustrated in FIG. 6. Furthermore, the control unit 50 identifies abnormalities, such as removal or cutting of the protective cover 30, by means of the detection signals through the patterned wiring 31, and when an abnormality is identified, performs a process, such as erasure or destruction of data, on the internal circuit 51. Thus, analysis of the secret data can be prevented before it occurs.

Next, the operations of the information protection device 102 with the patterned wiring 31 according to the second embodiment will be explained by each step S with reference to FIG. 8. The steps in FIG. 8 below are implemented, for example, in parallel with those in FIG. 5.

[Step S10]

The protective cover 30 is installed on the base B by means of the random-contact mechanical Hall element 11 and the fastening members 20. When the protective cover 30 is installed, the control unit 50 receives a device assembly completion notification (indicated by reference number a1 in FIG. 6) that is output.

[Step S11]

In the control unit 50, detection signals from the patterned wiring 31 provided on the protective cover 30 are received and the detection signals are monitored.

[Steps S12 and S13]

Based on the detection signals from the patterned wiring 31 received in step S11, the control unit 50 monitors whether or not there are any abnormalities such as wire breaks or short-circuits in the detection wires 31A in the patterned wiring 31 (step S12). If there are no abnormalities (YES in step S12), then the control unit 50 determines that there has been no unauthorized access of the protective cover 30 and the situation is normal (step S13), and the procedure returns to the prior step S11. Additionally, if it is determined that there is an abnormality in step S12 (NO in step S12), then the procedure advances to step S14.

[Step S14]

The procedure advances to the next step S15 on the assumption that there has been unauthorized access of the protective cover 30.

[Step S15]

The control unit 50 outputs, to the internal circuit 51 storing the secret data, a signal (represented by reference number a2 in FIG. 6) to erase and destroy the data, and the procedure in the present flow chart ends.

In the information protection device 102 configured as described above, the random-contact mechanical Hall element 11 is mounted on the protective cover 30 for protecting the internal circuit 51, and the states of the connection patterns P in the random-contact mechanical Hall element 11 are continually monitored. For this reason, as with the first embodiment, unauthorized access from the outside can be immediately detected and a high level of tamper resistance can be obtained.

Additionally, in the information protection device 102, the patterned wiring 31 is installed on the inner surface of the protective cover 30, and abnormalities such as removal and cutting of the protective cover 30 can be identified by means of detection signals obtained from the patterned wiring 31. Thus, when an abnormality occurs in the protective cover 30, a process such as erasure or destruction of data can be performed on the internal circuit 51, and analysis of the secret data can be prevented before it occurs.

Third Embodiment

The information protection device 103 according to the third embodiment of the present invention will be explained with reference to FIGS. 9 and 10.

The information protection device 103 according to the third embodiment has a different structure from those of the information protection devices 101 and 102 above in that multiple circumferential patterns 40 are arranged around the periphery of the random-contact mechanical Hall element 11.

Figure 9:
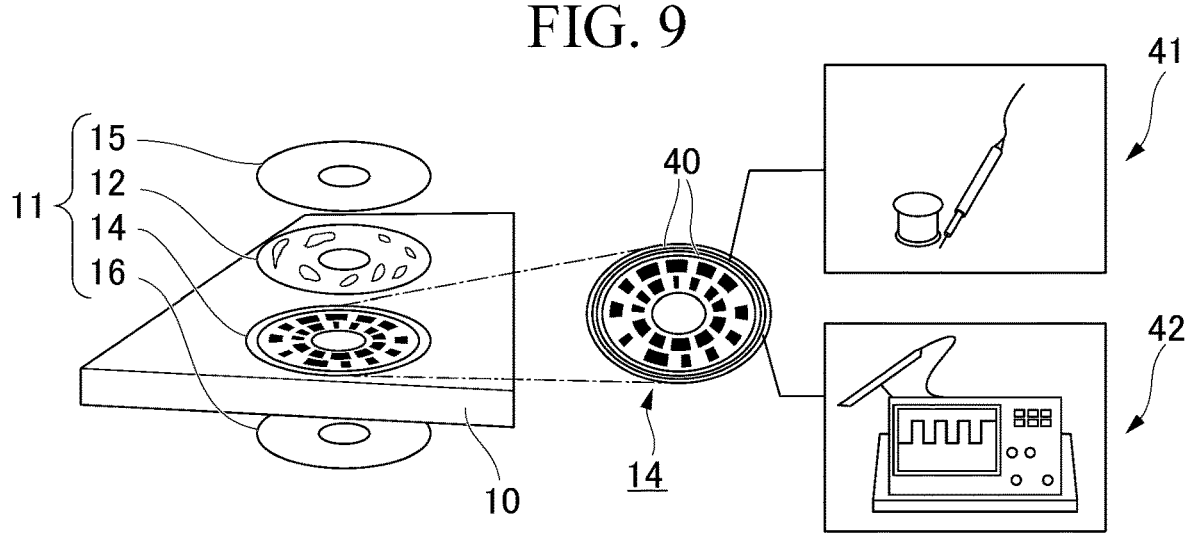
FIG. 9 is a schematic structural diagram of an information protection device according to a third embodiment of the present invention.
Figure 10:
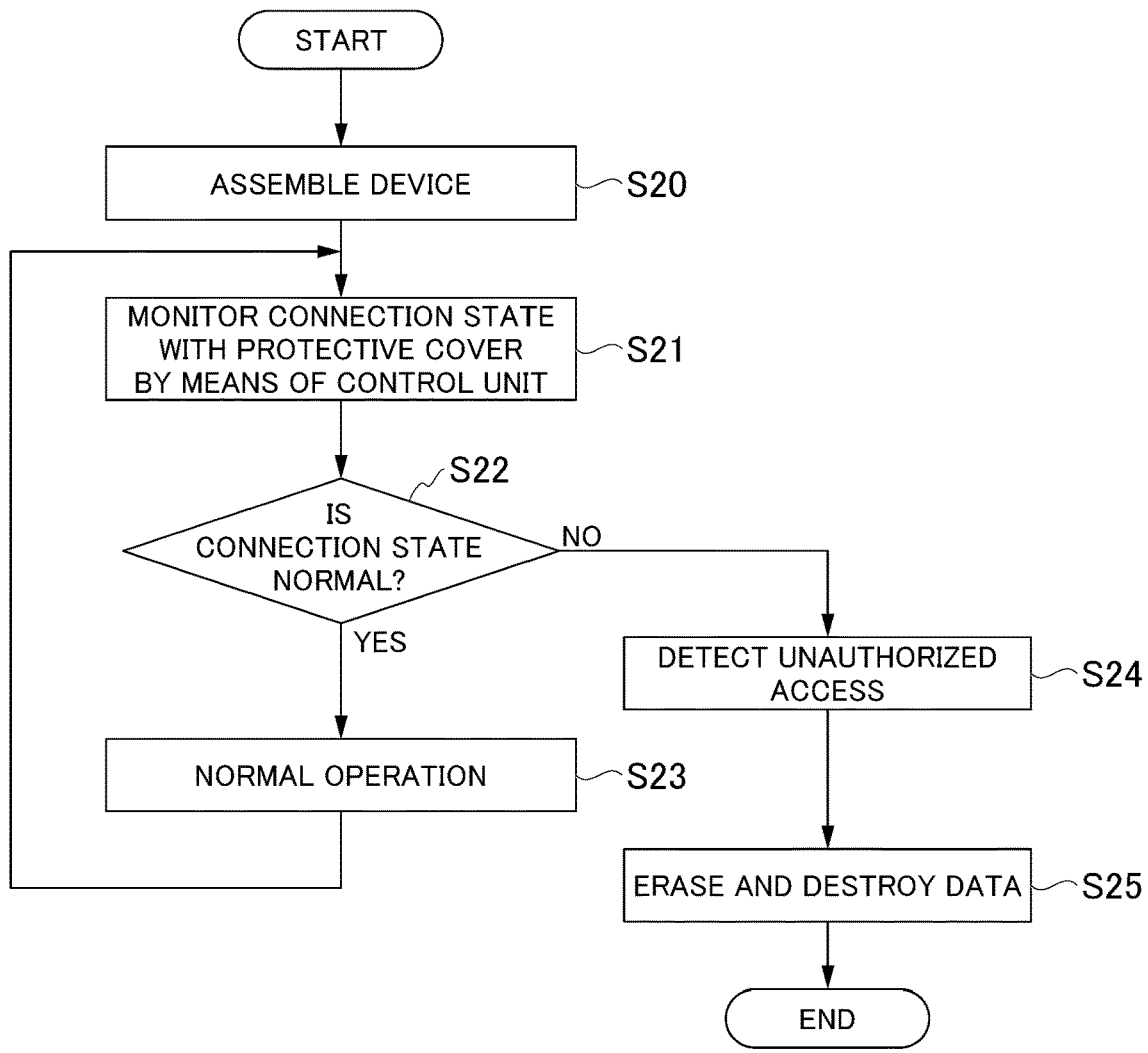
FIG. 10 is a flow chart indicating the operations performed by the information protection device according to the third embodiment.

As illustrated in FIG. 9, the circumferential patterns 40 are mounted on the printed circuit board 10 (first embodiment) or the protective cover 30 (second embodiment) that is the component to be protected.

Furthermore, the information protection device 103 according to the third embodiment is provided with circumferential patterns 40 around the periphery of the random-contact mechanical Hall element 11. As a result thereof, when an unauthorized person attempts to make modifications by means of a soldering iron 41 or to analyze the connection information such as by inserting an oscilloscope 42, these circumferential patterns 40 are contacted and short-circuited. At this time, the short-circuit state is detected by the control unit 50, which can determine that unauthorized access has occurred.

Next, the operations of the information protection device 103 with the circumferential patterns 40 according to the third embodiment will be explained by each step S with reference to FIG. 10. The steps in FIG. 10 below are implemented, for example, in parallel with those in FIGS. 5 and/or 8.

[Step S20]

The random-contact mechanical Hall element 11 having the circumferential patterns 40 is mounted on the printed wiring board 10 (first embodiment) or the protective cover 30 (second embodiment) that is a component to be protected. When the random-contact mechanical Hall element 11 has been installed, the control unit 50 receives a device assembly completion notification that is output.

[Step S21]

In the control unit 50, detection signals from the circumferential patterns 40 provided on the random-contact mechanical Hall element 11 are received and the detection signals are monitored.

[Steps S22 and S23]

It is monitored whether or not there are any abnormalities such as wire breaks or short-circuits in the circumferential patterns 40 based on the detection signals from the circumferential patterns 40 received in step S21 (step S22). If there are no abnormalities (YES in step S22), then the control unit 50 determines that there has been no unauthorized access of the random-contact mechanical Hall element 11 and the situation is normal (step S23), and the procedure returns to the prior step S21. Additionally, if it is determined that there is an abnormality in step S22 (NO in step S22), then the procedure advances to step S24.

[Step S24]

The procedure advances to the next step S25 on the assumption that unauthorized access to the random-contact mechanical Hall element 11 has occurred.

[Step S25]

The control unit 50 outputs, to the internal circuit 51 storing the secret data, a signal to erase and destroy the data, and the procedure in the present flow chart ends.

In the information protection device 103 configured as described above, the random-contact mechanical Hall element 11 is mounted on the printed wiring board 10 (first embodiment) or the protective cover 30 (second embodiment) that is the component to be protected, and the states of the connection patterns P in the random-contact mechanical Hall element 11 are continually monitored. For this reason, unauthorized access from the outside can be immediately detected and a high level of tamper resistance can be obtained.

Additionally, in the information protection device 103, the circumferential patterns 40 are installed around the periphery of the random-contact mechanical Hall element 11, and abnormalities such as removal and cutting of the random-contact mechanical Hall element 11 can be identified by means of detection signals obtained from the circumferential patterns 40. As a result thereof, when an abnormality is identified in the random-contact mechanical Hall element 11, a process such as erasure or destruction of data can be performed on the internal circuit 51, and analysis of the secret data can be prevented before it occurs.

In the above-described first to third embodiments, the information protection devices 101 to 103 detect unauthorized access from the outside by means of the random-contact mechanical Hall element 11. However, the invention is not limited thereto. In the information protection devices 101 to 103, the contact state in the random-contact mechanical Hall element 11 may be monitored and used to determine abnormalities such as loosening of the fastening means 20.

Whereas embodiments of the present invention have been explained in detail above by referring to the drawings, the specific structure is not limited to those in these embodiments, and design modifications and the like within a range not departing from the gist of the present invention are included.

Priority is claimed on Japanese Patent Application No. 2018-033107, filed Feb. 27, 2018, the entire disclosure of which is incorporated herein by reference.

INDUSTRIAL APPLICABILITY

The present invention relates to an information protection device that is highly tamper resistant, and an electronic apparatus using this information protection device.

REFERENCE SIGNS LIST

1 Random-contact mechanical Hall element
2 Conductive plate
3 Connection portion
4 Contact plate
5 Component to be protected
6 Fastening member
7 Communication line
7A Signal wire
10 Printed circuit board
11 Random-contact mechanical Hall element
12 Conductive plate
13 Connection portion
14 Contact plate
18 Communication line
18A Signal wire
20 Fastening member
30 Protective cover 31 Patterned wiring
32 Connector
33 Communication line
40 Outer circumference
100 Information protection device
101 Information protection device
102 Information protection device
103 Information protection device
B Base
P Conductive pattern

The invention claimed is:

1. An information protection device comprising:
a random-contact mechanical Hall element provided with a conductive plate that has a prescribed conductive pattern, and a contact plate that is stacked on the conductive plate and that has, in an interior thereof, a connection portion partially contacting the prescribed conductive pattern;
a communication line having multiple signal wires that are respectively connected to the connection portion in the random-contact mechanical Hall element; and
a control unit configured to, through the communication line, monitor connection information between the connection portion and the prescribed conductive pattern in the random-contact mechanical Hall element, and determine, based on the connection information, whether or not iniquity has occurred in accordance with whether or not a connection state between the prescribed conductive pattern and the connection portion has changed from an initial setting.

2. The information protection device according to claim 1, wherein, upon determining that iniquity has occurred based on the connection information supplied from the random-contact mechanical Hall element, the control unit erases information to be protected.

3. The information protection device according to claim 1, wherein the random-contact mechanical Hall element is formed so as to be ring-shaped, and a fastening member is inserted through a through-hole in a central portion of the random-contact mechanical Hall element.

4. The information protection device according to claim 3, wherein, in the random-contact mechanical Hall element, by rotating the conductive plate having a specific conductive pattern relative to the contact plate contacting the conductive plate, the connection state in the initial setting is made different for each random-contact mechanical Hall element.

5. The information protection device according to claim 3, wherein the random-contact mechanical Hall element is fastened to a control board containing information to be protected.

6. The information protection device according to claim 3, wherein the random-contact mechanical Hall element is fastened to a protective cover housing a circuit containing information to be protected.

7. The information protection device according to claim 6, wherein:
patterned wiring comprising multiple detection wires is installed in the protective cover; and
the control unit monitors a connection condition of the patterned wiring, and further determines that the iniquity has occurred when cutting or breaking of the patterned wiring is detected.

8. The information protection device according to claim 1, wherein:
multiple circumferential patterns are arranged around a periphery of the random-contact mechanical Hall element; and
the control unit monitors a short-circuit state of the circumferential patterns, and further determines that the iniquity has occurred when a short-circuit in the circumferential patterns is detected.

9. An electronic apparatus comprising an information protection device, wherein the information protection device includes:
a random-contact mechanical Hall element provided with a conductive plate that has a prescribed conductive pattern, and a contact plate that is stacked on the conductive plate and that has, in an interior thereof, a connection portion partially contacting the prescribed conductive pattern;
a communication line having multiple signal wires that are respectively connected to the connection portion in the random-contact mechanical Hall element; and
a control unit configured to, through the communication line, monitor connection information between the connection portion and the prescribed conductive pattern in the random-contact mechanical Hall element, and determine, based on the connection information, whether or not iniquity has occurred in accordance with whether or not a connection state between the prescribed conductive pattern and the connection portion has changed from an initial setting.

* * * * *